(12) United States Patent
Ericsson

(10) Patent No.: US 6,802,334 B2
(45) Date of Patent: Oct. 12, 2004

(54) METHOD OF MANUFACTURING SANITARY ARMATURE MEMBERS

(75) Inventor: Stefan Ericsson, Mora (SE)

(73) Assignee: FM Mattsson AB, Mora (SE)

(*) Notice: Subject to any disclaimer, the term of this patent is extended or adjusted under 35 U.S.C. 154(b) by 0 days.

(21) Appl. No.: 10/380,215
(22) PCT Filed: Sep. 14, 2001
(86) PCT No.: PCT/SE01/01973
  § 371 (c)(1),
  (2), (4) Date: Apr. 2, 2003
(87) PCT Pub. No.: WO02/23072
  PCT Pub. Date: Mar. 21, 2002

(65) Prior Publication Data
US 2003/0168100 A1 Sep. 11, 2003

(30) Foreign Application Priority Data
Sep. 15, 2000 (SE) ................................. 0003292

(51) Int. Cl.$^7$ ............................................. F16K 11/14
(52) U.S. Cl. ..................................... 137/270; 137/801
(58) Field of Search ............................. 137/270, 801, 137/615, 625.4, 625.41, 269

(56) References Cited

U.S. PATENT DOCUMENTS 4,676,270 A * 6/1987 Knapp et al. ............... 137/270
5,402,827 A * 4/1995 Gonzalez ................. 137/625.4

FOREIGN PATENT DOCUMENTS

DE 199 11 066 A1 9/2000

* cited by examiner

Primary Examiner—Kevin Lee
(74) Attorney, Agent, or Firm—Sughrue Mion, PLLC

(57) ABSTRACT

In a method of manufacturing different types of water and sanitary fitting elements, such as taps and mixers, there is used multiple functional parts that have parts which come into contact with water in use, and one or more casing parts which are at least partially visible. The water-contacted functional parts are formed in a module system that includes a limited number of elements, e.g. 10–15 in number, and are made of a material that will not deliver harmful substances to the water. The casing parts are made of another material and are given an inner shape or form which is adapted to the outer shape or form of the functional parts so the casing parts will surround the functional parts, either completely or partially, in an exchangeable manner. The functional parts may be made of a plastic material, e.g., a thermoplastic material, while the casing parts may be made of any chosen material. Also provided is a module system built-up of functional parts and casing of the aforesaid kind.

9 Claims, 6 Drawing Sheets

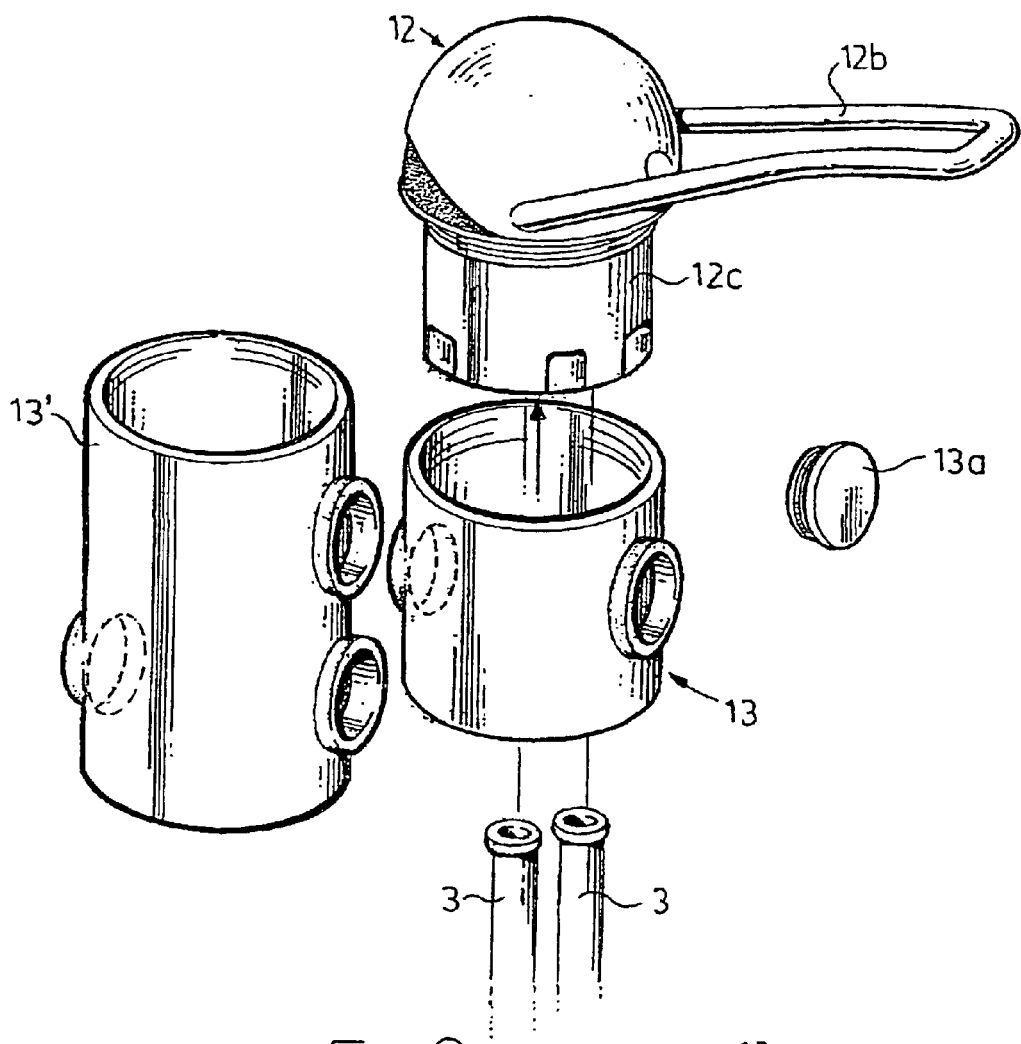
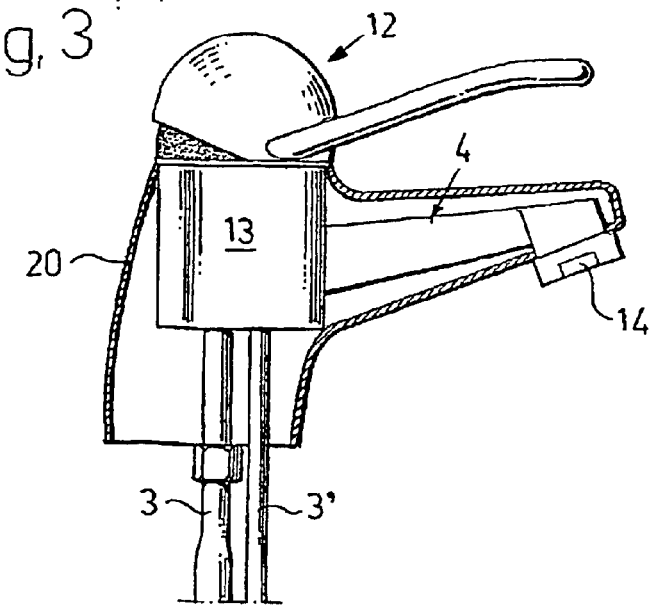

METHOD OF MANUFACTURING SANITARY ARMATURE MEMBERS

FIELD OF INVENTION

The present invention relates to the manufacture of fittings or fixtures, and more particularly to a method of manufacturing different types of water and sanitary fittings or components, such as taps and mixers, each of which includes a number of functional parts of which one or more have portions that are in contact with water in use, and one or more casing parts which are at least partially visible.

The invention also relates to different types of functional parts affiliated with such sanitary fittings, and to casing parts associated therewith.

DESCRIPTION OF THE BACKGROUND ART

The functional parts of different types of water taps and mixers that are in contact with water have hitherto been given a design which is adapted primarily to the type of fitting with which said functional part shall be used. Consequently, the area in which such functional parts can be used is limited. This means, among other things, that in the case of new constructions of the casing part of a sanitary fitting it is also necessary to redesign the functional parts included in said fitting and to impart to said functional parts a form or configuration that will fit the casing part concerned. Normally, it is not possible to use one and the same functional part in different types of fittings fixtures.

Functional parts that have been produced from metal will normally often deliver a hazardous quantity of metal ions to the water flowing through said parts, resulting in serious health and environmental problems—particularly in respect of drinking water.

This problem is not as serious in the case of plastic functional parts, e.g. thermal plastic parts.

Examples of functional parts produced from thermoplastic material will be found in WO-A1 97/17501, DE-A1 2 613 965, SE-B 401 552 and DE-A1 2 614 063. None of these documents states that the functional parts illustrated and described therein can be used in different types of sanitary fittings or fixtures.

OBJECTS OF THE INVENTION

According to one aspect, an object of the invention is to provide a method relating to the manufacture of fittings of the aforedescribed kind that will enable the manufacture of functional parts that fit will different types of sanitary fittings in a simple and inexpensive manner, and with which parts the aforementioned health and environmental hazards are avoided.

Another object is to provide such a method with which resultant functional parts can be combined in different ways to produce different types of mixer.

Another object is to provide a method of manufacturing sanitary fittings which enables the casing parts, i.e. the outside of the fittings to be varied in respect of design, material and surface treatment in accordance with developments in technology and fashion changes without needing to change/switch the functional parts.

A further object is to provide a method of manufacturing sanitary fittings which greatly reduces lead times and costs in respect of model changes.

SUMMARY OF THE INVENTION

These and other objects are fulfilled by an inventive method of the present invention.

Because the water-contacted functional parts form a module system that is constructed from a limited number of elements, said parts can be combined in different ways to produce different types of mixers. The fittings can be said to be built-up in accordance with a type of lego-system, which includes a limited number of elements, for example from 10–15 elements. Thus, a series of mixers and taps of different kinds can be produced from a limited number of standardised module elements.

At the same time, the casing parts, i.e. the outside of respective fittings, can be varied with respect to shape, material and surface treatment without needing to change the functional parts.

One significant advantage afforded by the invention is that the load on the environment is greatly reduced. The module elements shall thus be produced from environmentally friendly material which is accepted by current laws and product rules and regulations.

The fittings become lighter and the surface treatment of casing parts that was earlier necessary can be omitted completely when using certain materials.

According to one exemplary method, the functional parts are made from a plastic material, for instance from a thermoplastic material. This greatly reduces the risk of the release of harmful quantities of metal or other toxic substances, since no metal will come into contact with the water and since only material that is accepted with regard to foodstuffs is used.

In addition, it is preferred that the modularised functional parts are provided with given interfaces or boundary surfaces and that they can be typically core drawn in conjunction with injection moulding processes. The module elements, i.e. the functional parts, can thus be produced from thermoplastic material with the aid of traditional injection moulding machines and injection moulding methods. Alternatively, the module elements can be produced from some other material and with the aid of some other method of manufacture without departing from the concept of the invention.

The casing part may be produced from any one of a number of different materials, such as from stainless steel, zinc, plastic, brass, etc.

In one beneficial method of manufacture, the functional parts are provided with abutments or engaging parts which will enable a relevant number of functional parts to be readily mounted in a casing part.

Further advantages are gained when the casing part or parts is/are designed to hold the functional parts in place in their mounted position in said casing part or parts.

To this end, one or more casing parts and functional parts may be provided with co-acting devices, e.g. projections or wedges, that interact with grooves for fixing the functional parts in position in a casing part.

The casing part will therewith ensure that the functional parts remain in their respective mounted positions. Alternatively, a nut, a bayonet fitting or some other connection means may be used to this end.

In another aspect of the invention, the invention also relates to a functional part of a sanitary fitting.

According to a further aspect, the invention also relates to a casing part of a sanitary fitting.

Different aspects of the invention will now be made apparent in the following description of exemplifying embodiments described with reference to the accompanying drawings.

BRIEF DESCRIPTION OF THE DRAWINGS

FIG. 2 is an exploded perspective view of a functional part in the form of a lever provided with a single-grip mixer insert, said figure also showing two alternative insert carrying parts.

FIG. 3 is a partially cut-away side view of a washbasin mixer that has a few functional parts mounted in a casing part, in accordance with the invention.

DESCRIPTION OF EXEMPLARY EMBODIMENTS OF THE PRESENT INVENTION

FIGS. 1a–1k illustrate a number of different modularised functional parts for different types of single-lever mixers.

Figure 1A:
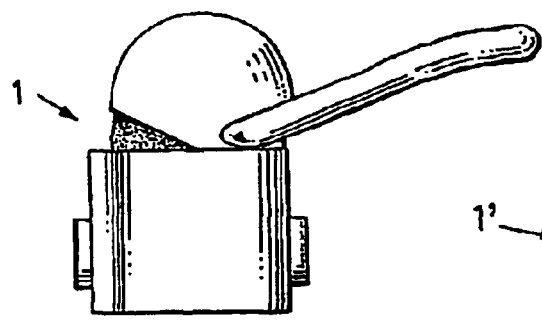
FIGS. 1a–1k are—in certain cases—partially cut-away side views of a number of functional elements which are built-up to form a module system and which can be used in a method of manufacture according to the invention.
Figure 1B:
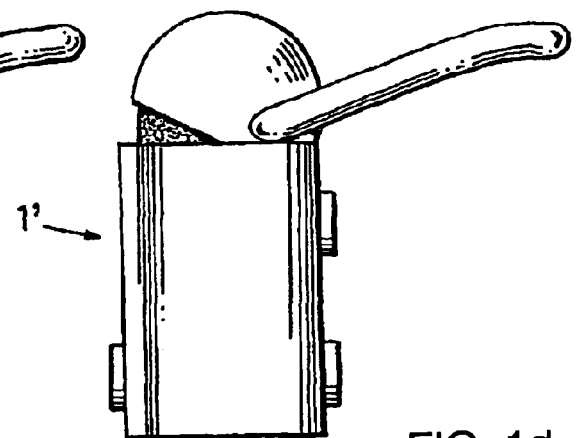

For instance, FIG. 1a illustrates a single-lever-regulating element 1 for washbasin mixers or sink mixers, while FIG. 1b illustrates a corresponding functional element 1' for a shower or bathtub mixer.

Figure 1C:
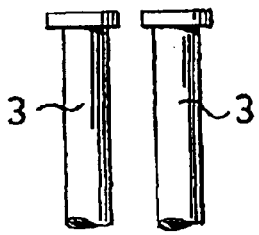

FIG. 1c illustrates two flanged hot water and cold water connecting pipes 3, intended for the two functional parts mentioned above, for instance.

Figure 1D:
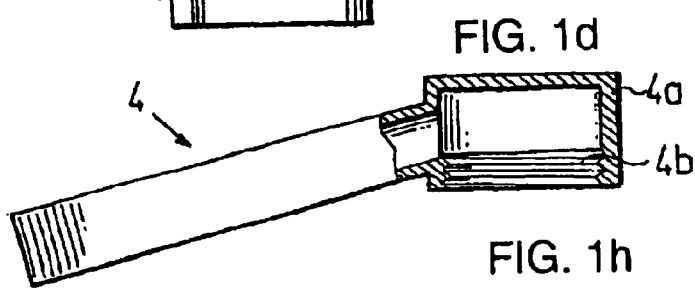

FIG. 1d illustrates an outlet pipe or spout 4 having a connecting portion 4a provided with an internal screw thread 4b, intended, for instance, for a washbasin mixer according to FIG. 1a or FIG. 1b.

Figure 1H:
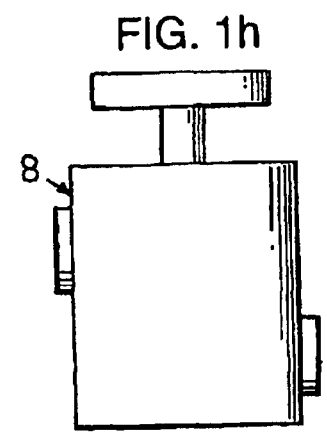
Figure 1E:
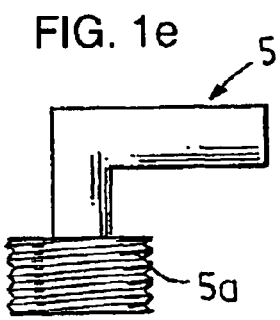
Figure 1F:
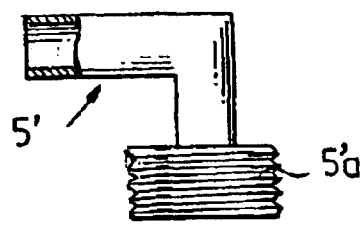

FIGS. 1e and if illustrate respectively a pair of angled connecting pipes 5 and 5' for a thermostat mixer or a single-grip lever, both of said functional parts having a connecting portion provided with an external screw thread 5a and 5'a. respectively.

Figure 1G:
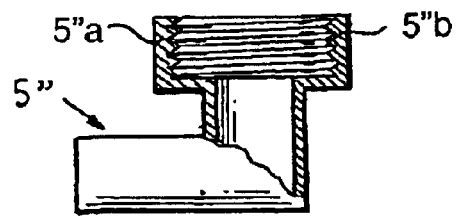

FIG. 1g illustrates a corresponding connecting pipe 5" that includes a connecting portion 5"a and an inner screw thread 5"b.

FIG. 1h illustrates a changeover device or switch 8 for a bathtub mixer, used in connection with a shower or a bath.

Figure 1I:
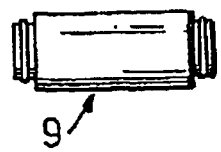
Figure 1J:
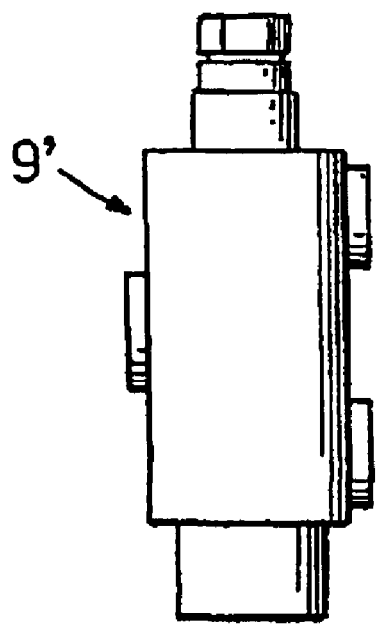
Figure 1K:
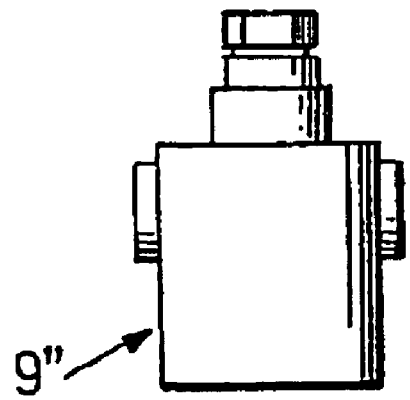

FIGS. 1i, 1j and 1k illustrate a few examples of separate connecting pipes and branch pipes 9, 9' and 9", the connecting portions of which may be provided with a sealing O-ring (not shown).

FIG. 2 illustrates a lever-equipped insert 12 equipped with an insert member 12C, a manoeuvring lever 12b, and two alternative accommodating parts (i.e., sleeve members) 13 and 13', a blind plug 13a and flanged connecting pipes 3 for a single-grip mixer. The illustrated functional parts constitute module elements that may be included in mixer fittings of many different kinds and in varying forms.

FIG. 3 is a partially cut-away view of a washbasin mixer that includes a lever-equipped insert 12, a short accommodating part 13 according to FIG. 2, and an outlet spout 4 in accordance with FIG. 1d.

The mixer also includes a jet concentrator 14 at the forward end of the spout 4. The functional parts are held in place by an outer casing 20 which surrounds the functional parts included in a module system, either completely or partially.

Figure 4:
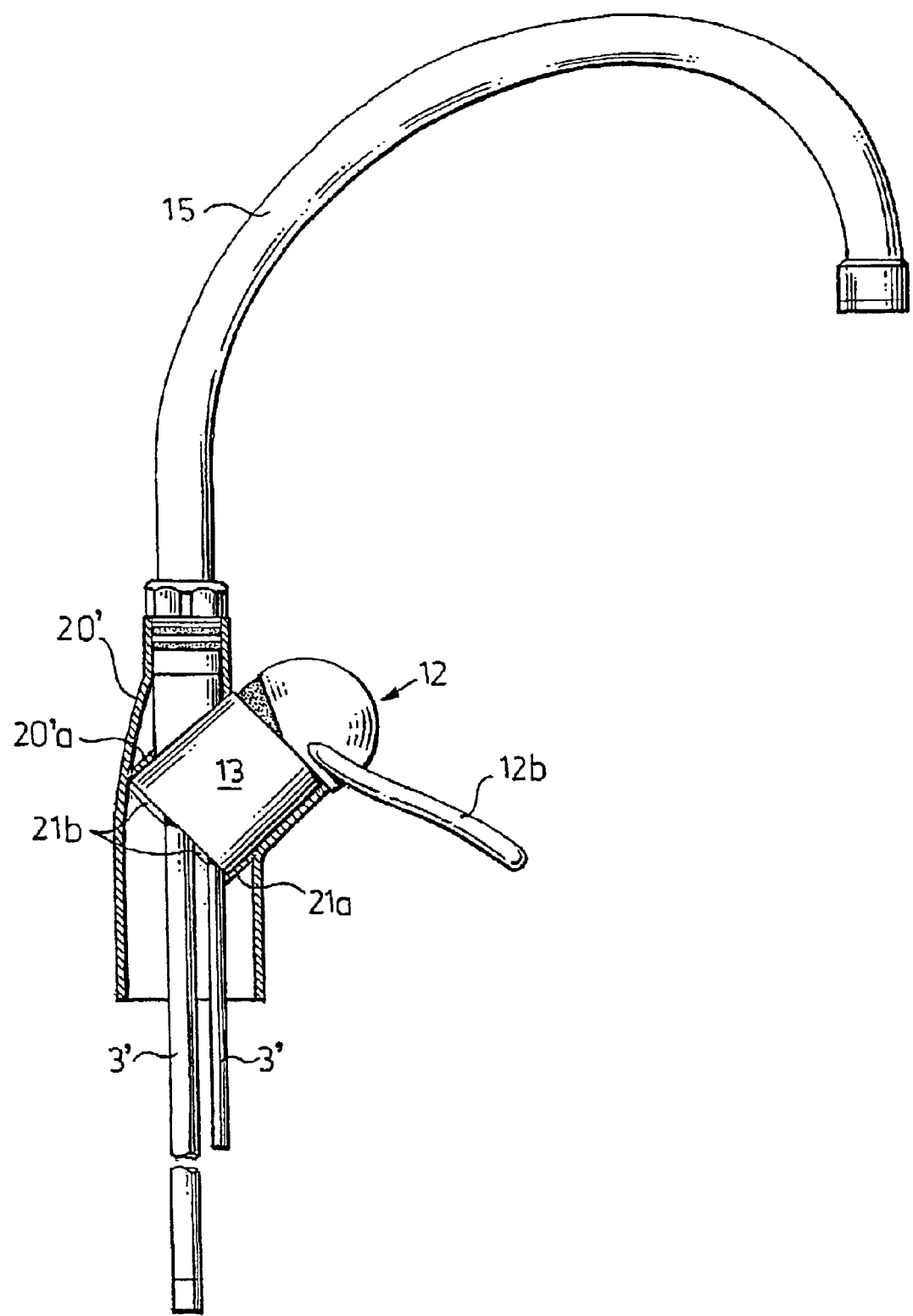
FIG. 4 is a partially cut-away view, corresponding to the side view in FIG. 1, of a sink mixer which includes certain functional parts that are similar to those of the FIG. 3 embodiment, together with other different functional parts.

FIG. 4 is a partially cut-away view of a sink mixer equipped with a standard outlet pipe 15 and two supply pipes 3' whose design differs to that of the supply pipes shown in FIG. 1a and FIG. 2. The module unit formed by the lever-equipped insert 12 and the accommodating part 13 is the same as that shown in FIG. 3, although said unit takes a different position in relation to a casing 20', whose design is different to that of the casing 20 in the last-mentioned figure.

The mixer may also include a connection part (not shown) that is pressed in from one side.

In the case of this embodiment, the casing 20' has a holding function obtained by the parts 20'a, 21a and the bottom part 21b, which is pushed in from beneath and which fixes the position of the functional parts together with said parts 20'a and 21a.

Figure 5:
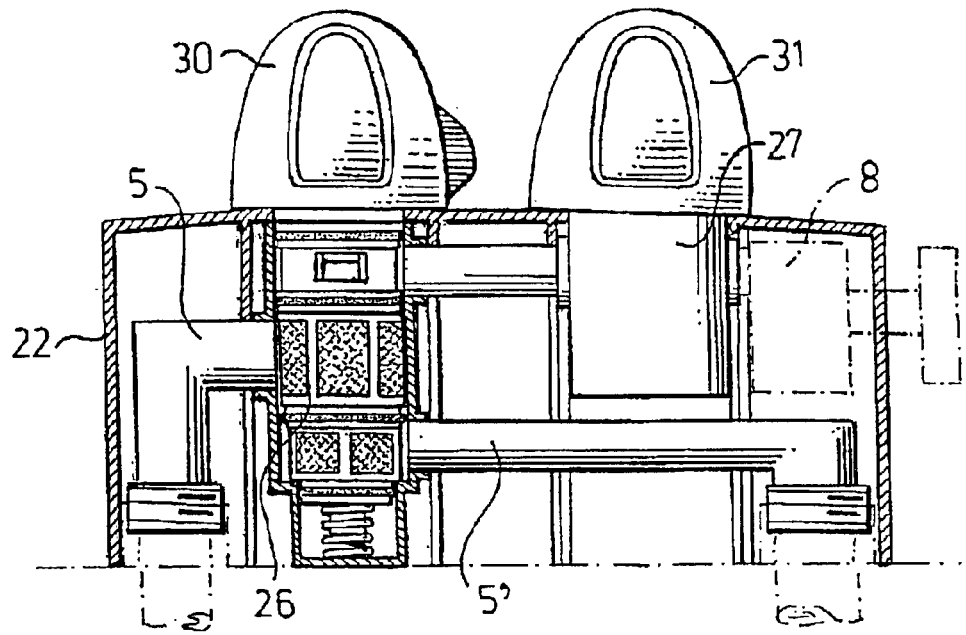
FIG. 5 is a partially cut-away side view of a thermostat mixer that includes a number of functional elements mounted in the casing part, and also hot water and cold water connecting elements.

FIG. 5 is a partially cut-away view of a thermostatic mixer that includes functional parts that come into contact with water, such as angled connecting elements 5, 5' and a changeover device or switch 8 for switching between shower and tub, in accordance with the earlier figures. In addition, there is included, among other things, a pressure-balanced thermostat insert 26 and shut-off element 27 that includes a valve member and valve seat in accordance with normal standards in this field. C.f elements 9' and 9" in FIGS. 1j and 1k respectively.

The connecting elements 5, 5' are located within the surrounding casing 22, which also contributes towards fixing the relevant functional parts in position. Reference numerals 30 and 31 indicate typical knobs for adjusting temperature and water flow rate.

Figure 6:
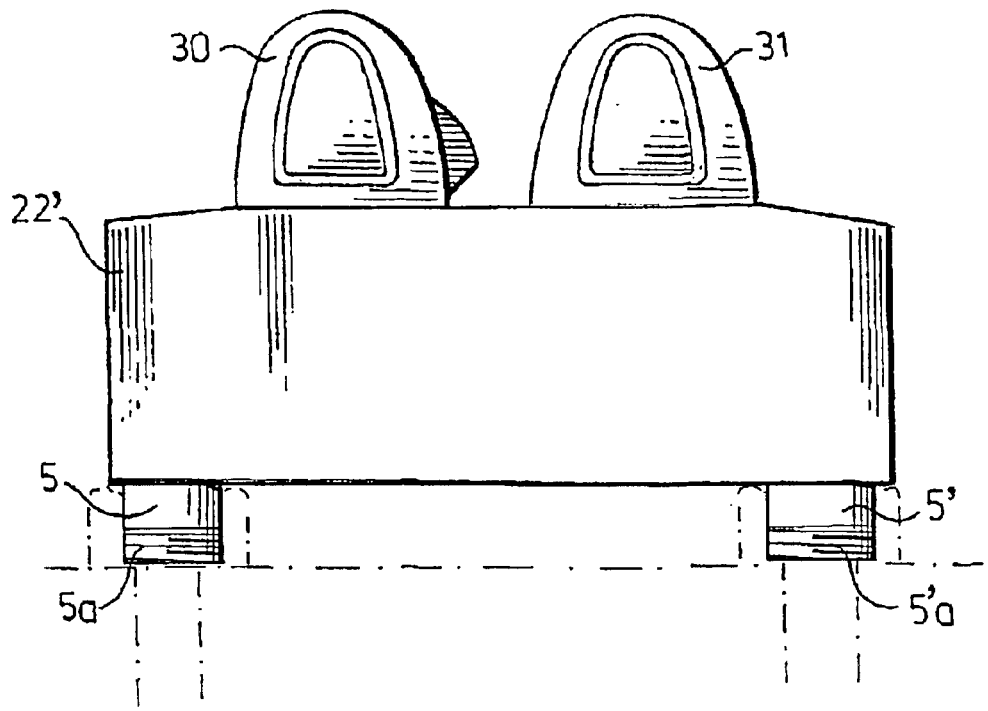
FIG. 6 is a side view of an alternative thermostat mixer which has hot water and cold-water connecting elements projecting out from the casing part.

FIG. 6 illustrates a modified embodiment of the thermostat mixer shown in FIG. 5, where the ends 5a, 5'a of the connecting parts 5, 5' lie outside the casing 22'. In the case of this embodiment, the mixer can be mounted tightly adjacent a wall, in a bathroom, for instance.

Figure 7:
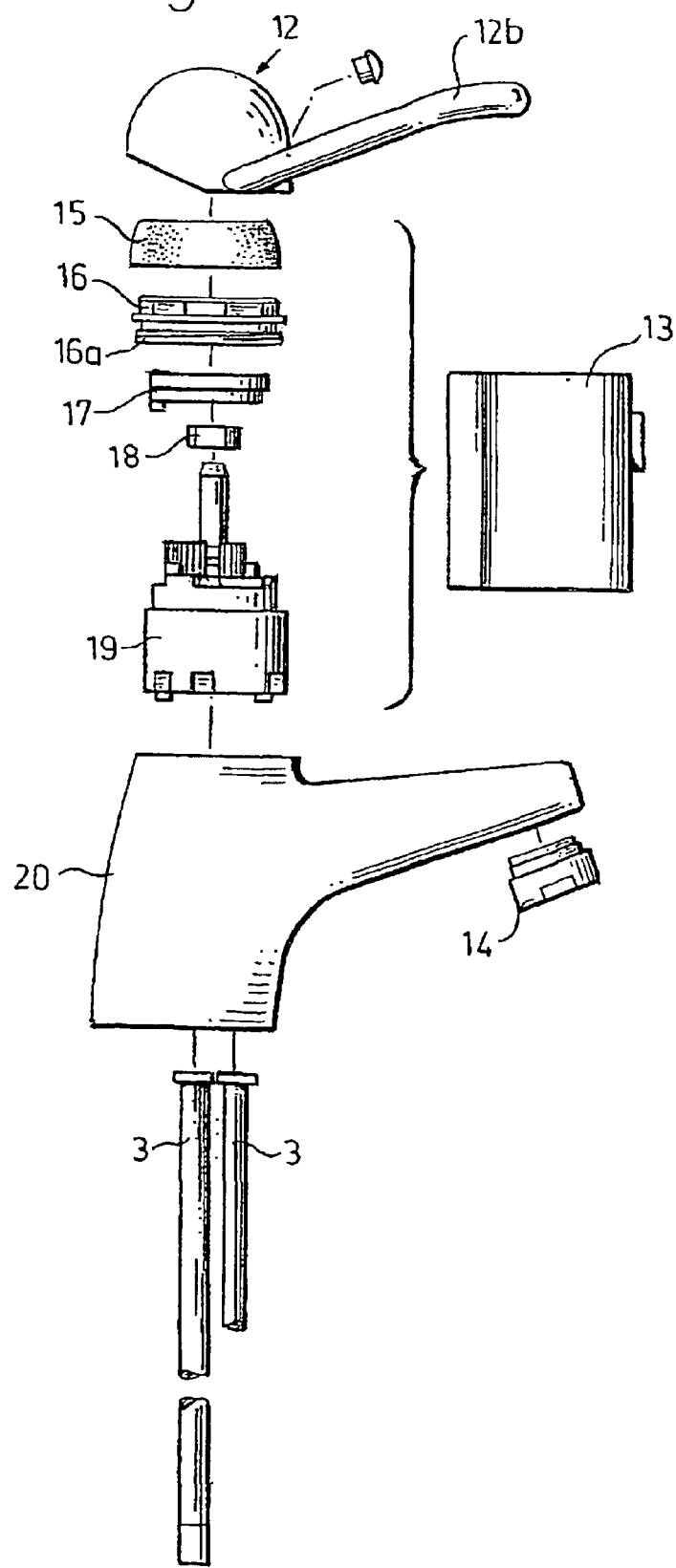
FIG. 7 is an exploded view of all elements included in a washbasin mixer, said elements also including functional parts and a casing part designed in accordance with the invention.

FIG. 7 is an exploded view of a washbasin mixer with the components of a traditional insert arranged in an accommodating part 13 provided with an outlet spout 4 according to FIG. 1c (not shown).

The components or elements included in the insert are in the following order as seen from top to bottom: handle part 12, cap 15, nut 16 with washer 16a, temperature limiting part 17, flow limiting part 18, and ceramic shut-off and regulating part 19.

The insert member 12c is thus located in the illustrated insert accommodating part (i.e., sleeve member) 13, which constitutes a functional part in the inventive module system. Thus, as opposed to known mixers, the mixer casing 20 does not conduct water and can therefore be made of a material, such as metal, which can satisfy aesthetic requirements primarily, without danger of harmful metal ions being delivered to the drinking water.

On the other hand, those functional parts of the module system that come into contact with water are produced from a material which is not harmful in the aforesaid respect, e.g. from a thermoplastic material. Certain functional parts may also be made of certain metals that do not emit harmful ions.

Consequently, it will be understood that the illustrated embodiments merely comprise a number of examples of fitting components produced in accordance with the invention, where functional parts belong to a module system comprised of a limited number of elements, while the casing parts may have a design which varies in accordance with fashion swings and produced from material different to that used for the water-contacting functional parts.

These persons skilled in this art will realise that a module system comprised of functional parts in accordance with the invention may be produced in different ways and with differently designed units than those described above and illustrated in the accompanying drawings.

What claimed is:

1. A method of manufacturing different types of water and sanitary fittings, comprising:

providing functional parts belonging to a module system, at least one of said functional parts being an insert member adapted to contact with water during use and comprised of a non-metal material, and at least one of said functional parts being a sleeve member having one or more peripheral openings, said insert member being located in said sleeve member so that said sleeve member does not contact with water during use; and providing at least one casing part that is produced from a different material from that of said insert member, said casing part being at least partially visible during use, said casing part configured to correspond the outer shape of the modularized functional parts so as to replaceably surround said modularized functional parts either completely or partially.

2. A method according to claim 1, wherein the insert member is made of a plastic material.

3. A method according to claim 2, wherein the modularized functional parts have an interface or boundary surface and are produced by traditional core drawing in an injection molding process.

4. A method according to claim 1, wherein the functional parts are provided with abutments or engagement parts for mounting the functional parts together.

5. A method according to claim 4, wherein said casing part is adapted to hold the functional parts in their mounted positions in said casing part.

6. A method according to claim 5, wherein the casing parts and the functional parts are provided with co-acting elements, that engage with co-acting grooves for fixing functional parts in position in the casing part.

7. A functional part of a sanitary fitting, which is in contact with water during use and which is adapted for accommodation in a casing part of said fitting, comprising:

a module system that comprises 10–15 module elements, one of said module elements being a sleeve member having one or more peripheral openings, wherein said module elements are capable of forming in different combinations functional parts for different types of sanitary fittings;

one of said module elements being an insert member made of a non-metal material; and part adapted for mounting in different types of casing parts in a readily exchangeable fashion, wherein said insert member is located in said sleeve member so that said sleeve member does not contact water during use while said insert member contacts water during use.

8. A functional part according to claim 7, wherein said insert member is made of a thermoplastic material.

9. A functional part for a sanitary fitting according to claim 7, wherein said functional part is adapted to be accommodated in the casing part and said casing part is made of a material different from that of the insert member, and said casing part includes elements for coacting with corresponding elements of said functional part so as to fix said functional part in its operative position in said casing part.

* * * * *